(12) United States Patent  
Englund

(10) Patent No.: US 10,650,648 B2  
(45) Date of Patent: May 12, 2020

(54) METHOD AND SYSTEM FOR DISTRIBUTED ACOUSTIC SENSING

(71) Applicant: Mark Andrew Englund, Mosman (AU)

(72) Inventor: Mark Andrew Englund, Mosman (AU)

( * ) Notice: Subject to any disclaimer, the term of this patent is extended or adjusted under 35 U.S.C. 154(b) by 0 days.

(21) Appl. No.: 16/331,918

(22) PCT Filed: Sep. 8, 2017

(86) PCT No.: PCT/AU2017/050985  
§ 371 (c)(1),  
(2) Date: Mar. 8, 2019

(87) PCT Pub. No.: WO2018/045433  
PCT Pub. Date: Mar. 15, 2018

(65) Prior Publication Data  
US 2019/0197846 A1    Jun. 27, 2019

(30) Foreign Application Priority Data  
Sep. 8, 2016 (AU) ............................... 2016903617

(51) Int. Cl.  
*G08B 13/18* (2006.01)  
*G08B 13/186* (2006.01)  
(Continued)

(52) U.S. Cl.  
CPC ........... *G08B 13/186* (2013.01); *G01H 9/004* (2013.01); *H04R 23/008* (2013.01)

(58) Field of Classification Search  
None  
See application file for complete search history.

(56) References Cited

U.S. PATENT DOCUMENTS

2010/0158431 A1    6/2010  Huffman et al.  
2012/0063555 A1*   3/2012  Pullela ................. H04B 1/1638  
                                                        375/350  
(Continued)

FOREIGN PATENT DOCUMENTS

WO    WO2011/058313 A2    5/2011  
WO    WO 2016/012760 A2   1/2016

OTHER PUBLICATIONS

Englund, Mark Andrew, International Search Report and Written Opinion, PCT/AU2017/050985, dated Nov. 21, 2017, 5 pgs.  
(Continued)

*Primary Examiner* — Adolf Dsouza  
(74) *Attorney, Agent, or Firm* — Morgan, Lewis & Bockius LLP

(57) ABSTRACT

Described herein is a method and system of distributed acoustic sensing, such as in an urban or metropolitan area involving a dedicated and established fibre optic communications network including a data centre. In general, the disclosed method and system includes the steps of (a) selecting an optical fibre cable installation having a path extending across a selected geographical area, the optical fibre cable installation including a bundle of optical fibres and forming part of a fibre-optic communications network, (b) determining characteristics associated with the optical fibre and/or the selected optical fibre installation, (c) transmitting outgoing light in the optical fibre, (d) receiving reflected light back scattered along the optical fibre, and (e) based on the reflected light and the determined characteristics, generating an alert signal representative of an acoustic event. The disclosed method and system is thereby configured to detect acoustic events near or within the selected geographical area.

22 Claims, 7 Drawing Sheets

(51) Int. Cl.
  *G01H 9/00*   (2006.01)
  *H04R 23/00*   (2006.01)

(56) References Cited

U.S. PATENT DOCUMENTS

| | | | |
|---|---|---|---|
| 2012/0230629 A1 | 9/2012 | Hill et al. | |
| 2012/0230639 A1* | 9/2012 | Taru | G02B 6/02333 385/125 |
| 2014/0123759 A1* | 5/2014 | Minto | F17D 5/005 73/592 |
| 2014/0362668 A1* | 12/2014 | McEwen-King | G01H 9/004 367/118 |

OTHER PUBLICATIONS

Hill, David, Fiber Sensing: Optical fiber monitors the arterial networks of commerce; Laser Focus World, Aug. 6, 2015, 7 pgs.
Williams, John, Distributed Acoustic Sensing for Pipeline Monitoring, Jul. 2012, vol. 239 No. 7, https://pgjonline.com/2012/07/23/distributedacousticsensingforpipelinemonitoring/, 6 pgs.
Englund, Mark Andrew, International Preliminary Report on Patentability, PCT/AU2017/050985, dated Mar. 12, 2019, 6 pgs.
Englund, Mark A., Extended European Search Report, EP17847826, dated Mar. 2, 2020, 9 pgs.

\* cited by examiner

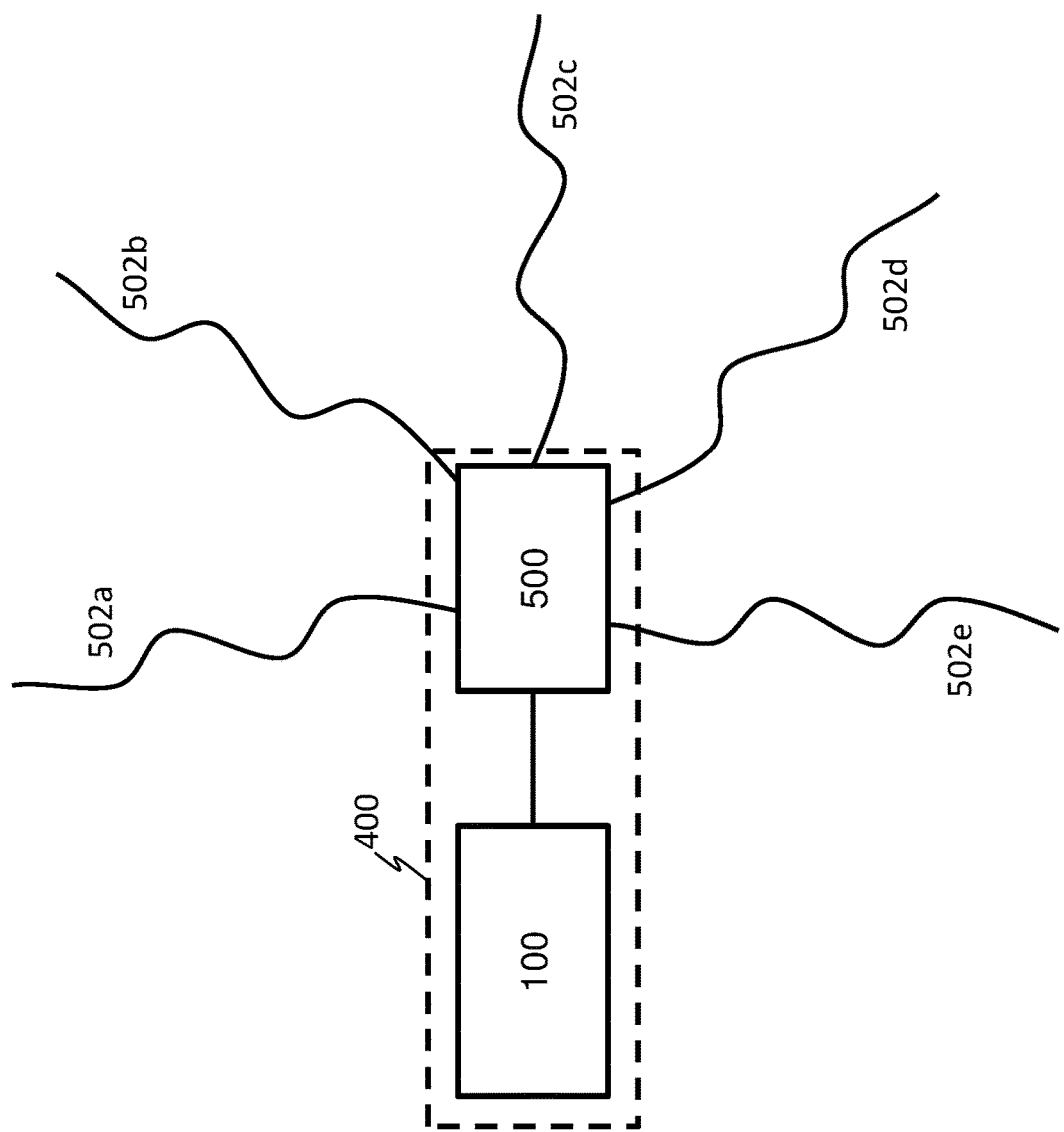

METHOD AND SYSTEM FOR DISTRIBUTED ACOUSTIC SENSING

CROSS REFERENCE TO RELATED APPLICATIONS

This application is a United States National Stage Application filed under 35 U.S.C. § 371 of PCT Patent Application Serial No. PCT/AU2017/050985 filed on Sep. 8, 2017, which claims the benefit of and priority to Australian Patent Application No. 2016903617 filed on Sep. 8, 2016, each of which is hereby incorporated by reference in its entirety.

FIELD OF THE INVENTION

The present invention generally relates to a method of distributed acoustic sensing based on one or more optical fibres. More particularly, the present invention relates to a method of distributed acoustic sensing based on one or more installed optical fibre cables.

BACKGROUND OF THE INVENTION

Fibre-optic distributed acoustic sensing can detect acoustic events in surrounding regions along an optical fibre. An acoustic event can be caused by incidents such as underground digging near a gas pipe, water pipe or a power cable, or pedestrian and road traffic activities. Different types of incidents may cause different acoustic signatures in the acoustic event. Monitoring of acoustic events therefore allows for alerts to be generated for the prevention or identification of these incidents, or for tracking of road users in the case of pedestrian and road traffic.

The method of deploying a dedicated optical fibre for distributed acoustic sensing may make sense from a design perspective, such that the fibre optic conditions and parameters (e.g. spatial uniformity along the optical fibre, trench depths, and levels of acoustic attenuation) are known or well-controlled upon installation. However, the installation of a dedicated optical fibre for distributed acoustic sensing can be expensive and disruptive, particularly in and around an urban centre.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE INVENTION

According to a first aspect of the present disclosure, there is provided a method of distributed acoustic sensing, the method including:
  selecting an optical fibre cable installation having a path extending across a selected geographical area, the optical fibre cable installation including a bundle of optical fibres and forming part of an established and dedicated fibre-optic communications network, the bundle of optical fibres including an unused channel or unlit optical fibre for communication;
  determining characteristics associated with the optical fibre and/or the selected optical fibre installation, including geospatially calibrating the optical fibre for mapping between one or more positions along the length of the optical fibre and a corresponding one or more locations in the geographical area;
  transmitting outgoing light in the optical fibre;
  receiving reflected light back scattered along the optical fibre, the reflected light including fluctuations over time; and
  based on the fluctuations and the determined characteristics, generating an alert signal representative of an acoustic event.

The fibre-optic communications network may be an urban or metropolitan area network. Alternatively or additionally, the fibre-optic communications network may be an enterprise network. The enterprise network may include one or more data centres. Where the enterprise network includes a plurality of data centres these are interconnected by optical fibre installations.

The spatially calibrating step may include generating an acoustic calibration signal at or adjacent the one or more positions along the optical fibre and detecting corresponding fluctuations at the one or more locations in the geographical area. It may further include determining and logging the geospatial locations of the positions in terms of geographic coordinates on the earth's surface, detecting corresponding fluctuations at the one or more locations in the geographical area in received reflected light backscattered along the optical fibre, and determining the path length of the optical fibre corresponding to the one or more geospatial locations.

The spatially calibrating step may further comprise correlating the path length of the optical fibre with the geographic co-ordinates of the one or more locations to generate a look up table correlating optical path length with geographic co-ordinates.

The alert generating step may include determining a location of an occurrence of an incident in the geographical area based on a corresponding fluctuation detected based on the mapping.

The characteristics determining step may include acoustically calibrating the optical fibre to reduce impact of unwanted acoustic interference. The acoustically calibrating step may include applying a spectral filter to the fluctuations to band-pass or band-reject the unwanted acoustic interference.

The selected geographical area may include multiple zones corresponding to multiple sections of the optical fibre, and the spectral filter applying step may include applying the spectral filter with band-pass or band-reject characteristics based on one of the multiple zones or corresponding sections. Alternatively or additionally, the spectral filter applying step may include applying the spectral filter with band-pass or band-reject characteristics based on the time of a day and/or the day of a week.

The characteristics determining step may include physically calibrating the optical fibre. The physically calibrating step may include obtaining any one or more of the following properties of the optical fibre: core properties, attenuation properties, and trench properties. The core properties may include core diameter and/or numerical aperture. The attenuation properties may include propagation loss, existing faults and/or spliced points. The trench properties may include burial conditions and/or cable enclosure conditions.

It will be appreciated that there are significant variations in the material surrounding the trench and cable, including rock, gravel, concrete, sand, water, earth, clay, bitumen or a combination of one of more of these. The acoustic impedance of these materials varies significantly, with the result that there will be variations in impedance between the perturbation or source of interest and the fibre optic cable.

Seismic calibration of the surrounding media is performed in a similar way to seismic profiling of the type performed in oil and gas prospecting, involving known techniques for characterising acoustic impedance around well casings. In the present case the objective is not to determine the types and states of surrounding materials but rather the acoustic and seismic transfer functions that these materials form spatially between the fiber and the perturbations of interest. Such transfer functions allow the heterogeneous media to be accounted for and so allow an accurate estimate of the spatial position, kinetics and the source frequencies present of any given perturbation around the optical fiber. The three precursory calibration steps that can be performed thus include optical calibration of fiber itself, geospatial calibration, and seismic calibration of surrounding media.

The alert signal generating step may include classifying the alert signal into one or more classes of alerts based on acoustic signatures of the fluctuations. The selected geographical area may include multiple zones corresponding to multiple sections of the optical fibre, each zone or corresponding section being associated with generation of one or more selected classes of alerts. Alternatively or additionally, the selected geographical area may include multiple zones corresponding to multiple sections of the optical fibre, each zone or corresponding section being associated with non-generation of one or more excluded classes of alerts.

The one or more selected or excluded classes of alerts corresponding to each zone or section of the optical fibre may be related to rail monitoring, road monitoring, and perimeter intrusion detection.

The method may further include switching the transmission of the outgoing light and the reception of the reflected light to another unused channel or unlit optical fibre for communication in, the other optical fibre being in another bundle of optical fibres in another selected optical fibre cable installation having another path extending across another selected geographical area. The switching step may include time-multiplexing the transmission of the outgoing light and the reception of the reflected light to multiple optical fibre cable installations.

The method may further include the step of bypass-splicing to bypass connecting infrastructure. The connecting infrastructure may also include one or more fibre transfer panels (FTPs) or patch panels. Adjusting band-pass or band-reject frequency range of the spectral filter and determining the resulting noise level based on the adjusted frequency range may also occur.

The method may further including determining a speed of the acoustic event and, based on the determination, suppressing or enabling the generation of the alert signal representative of the acoustic event.

According to a second aspect of the present disclosure, there is provided a system for distributed acoustic sensing, the system including:
 a distributed sensing unit for:
  transmitting outgoing light in an optical fibre;
  receiving reflected light back scattered along the optical fibre, the reflected light including fluctuations over time; and
  based on the fluctuations, generating an alert signal representative of an acoustic event, and
 an optical switch for coupling the distributed sensing unit to a selected one of multiple optical fibre cable installations, each installation having a path extending across a respective selected geographical area and including a bundle of optical fibres and forming part of a fibre-optic communications network, the bundle of optical fibres including an unused channel or unlit optical fibre for communication.

The optical switch and the distributed sensing unit may be located in a data centre connecting to an enterprise network.

The multiple fibre cable installations may be connected to or terminated at the data centre.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 5 illustrates an example of the system of FIG. 1 optically coupled to an optical switch and multiple optical fibre cable installations.

DETAILED DESCRIPTION OF EMBODIMENTS

The principle of fibre-optic distributed acoustic sensing relies on the occurrence of an acoustic event causing a corresponding localised perturbation of refractive index of an optical fibre. Due to the perturbed refractive index, an optical interrogation signal transmitted along an optical fibre and then back-scattered in a distributed manner (e.g. via Rayleigh scattering or other similar scattering phenomena) along the length of the fibre will manifest in fluctuations (e.g. in intensity and/or phase) over time in the reflected light. The magnitude of the fluctuations relates to the severity or proximity of the acoustic event. The timing of the fluctuations along the distributed back-scattering time scale relates to the location of the acoustic event.

Figure 1A:
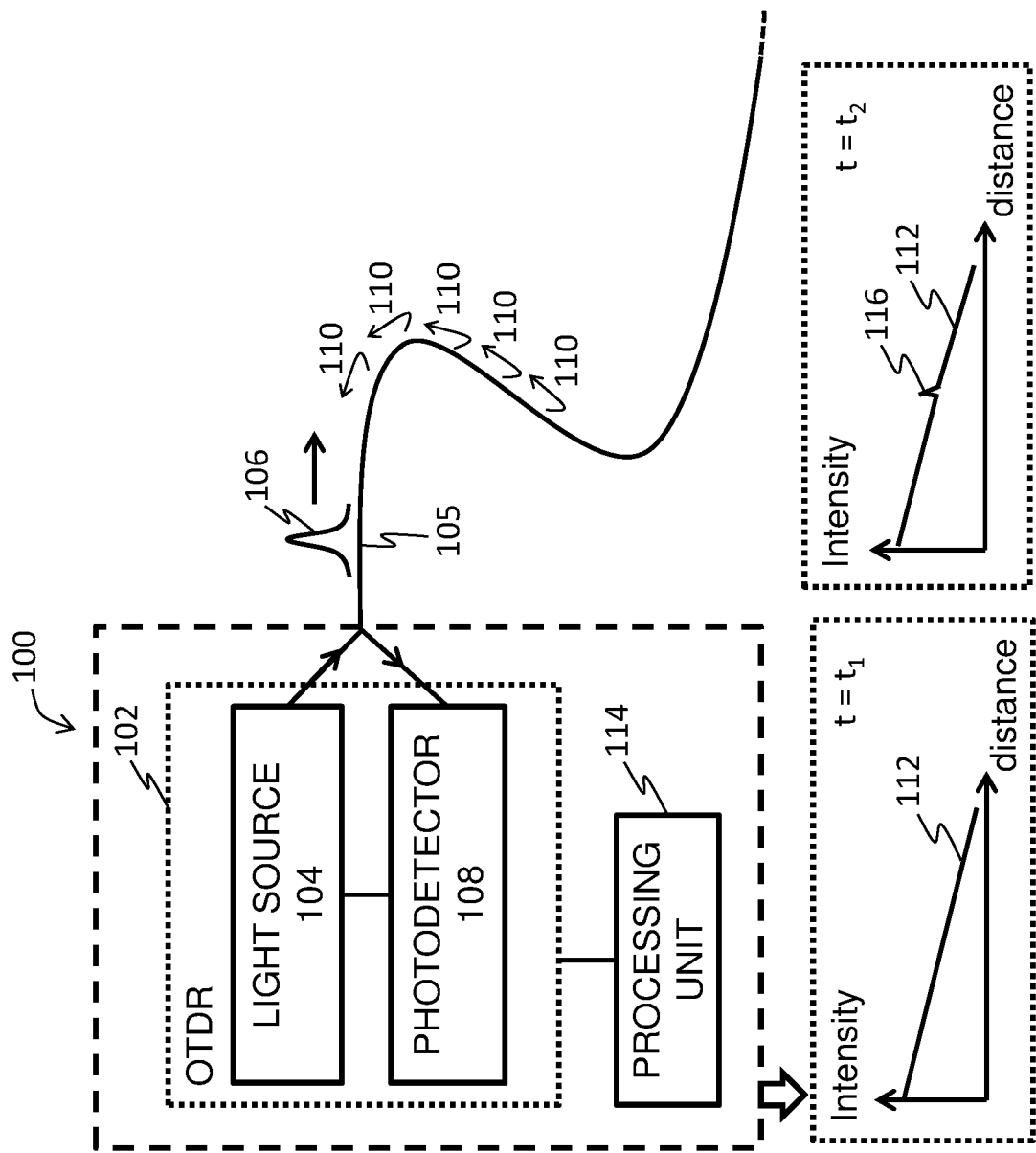
FIG. 1a illustrates an example of a system for distributed acoustic sensing.
Figure 1B:
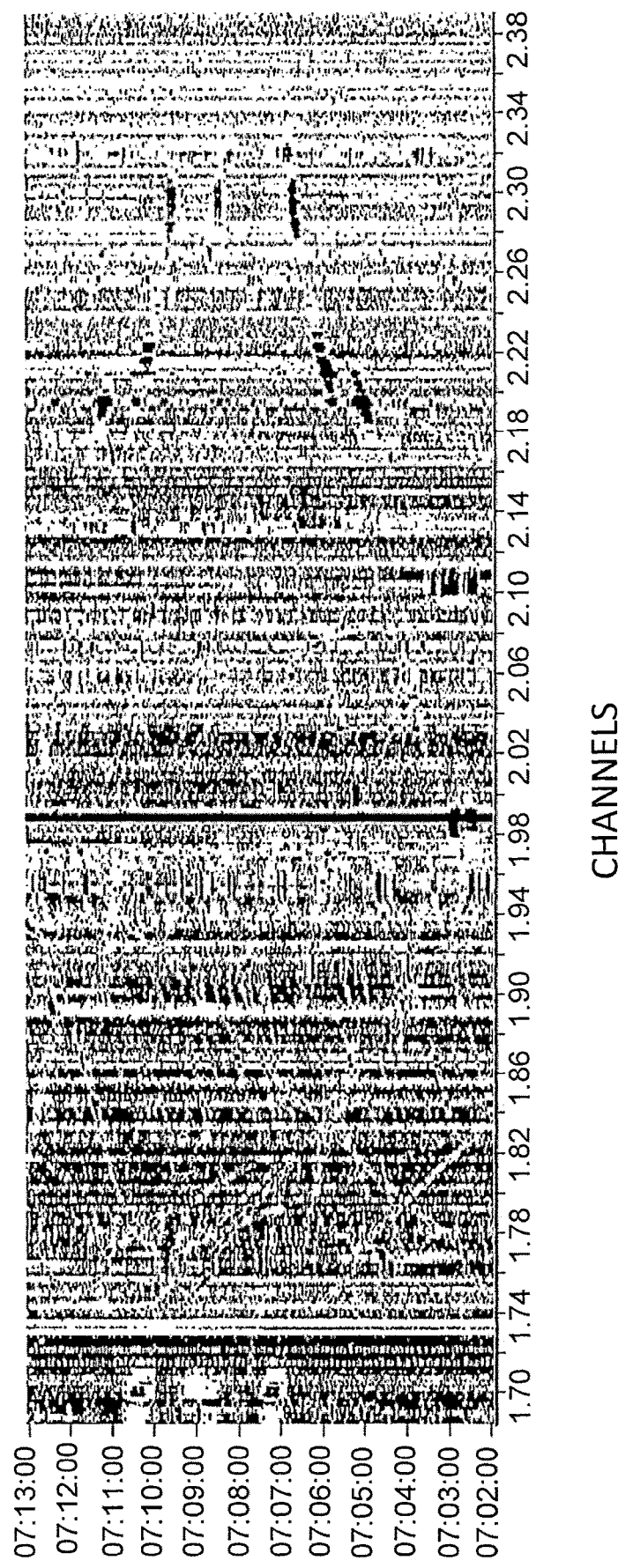
FIG. 1b illustrates an example of a density plot of electrical signals generated by the system of FIG. 1a over time.

In one example, a unit 100 for use distributed acoustic sensing (DAS) is illustrated in FIG. 1a. The DAS unit 100 includes an optical time-domain reflectometer (OTDR) 102. The OTDR 102 includes a light source 104 to emit an optical interrogation signal 106. The interrogation signal 106 to be sent into the optical fibre 105 may be in the form of a short optical pulse. The OTDR 102 includes a photodetector 108 configured to detect the reflected light 110 and produce a corresponding electrical signal 112 with an amplitude proportional to the reflected optical intensity. The DAS unit 100 also includes a processing unit 114, within or separate from the OTDR 102, configured to measure the fluctuations in the electrical signal 112 for determining the acoustic event based on the measured fluctuations 116 in intensity as compared between two different times ($t_1$ and $t_2$). FIG. 1b illustrates an example density plot combining electrical signals 112 generated by the DAS unit 100 of over time. The horizontal axis (labelled "Channel") represents position along the fibre, the vertical axis (labelled "Time") represents time, and the colour-coded amplitude of the plot represents reflected intensity. In FIG. 1b, features such as straight lines with relatively constant gradients are associated with moving objects (with the gradients being indicative of speed) that cause the relevant acoustic events detected by the DAS unit 100. If the OTDR is phase-sensitive, phase fluctuations in the reflected light may be additionally or alternatively measured. FIG. 1b is also offset to remove the attenuation slope in the electrical signal 112 present in FIG. 1a. The acoustic event being determined may be indicative of specific stationary or moving occurrences, such as excavation, drilling, digging, traffic flows, trains passing by and pedestrian flows.

Figure 2:
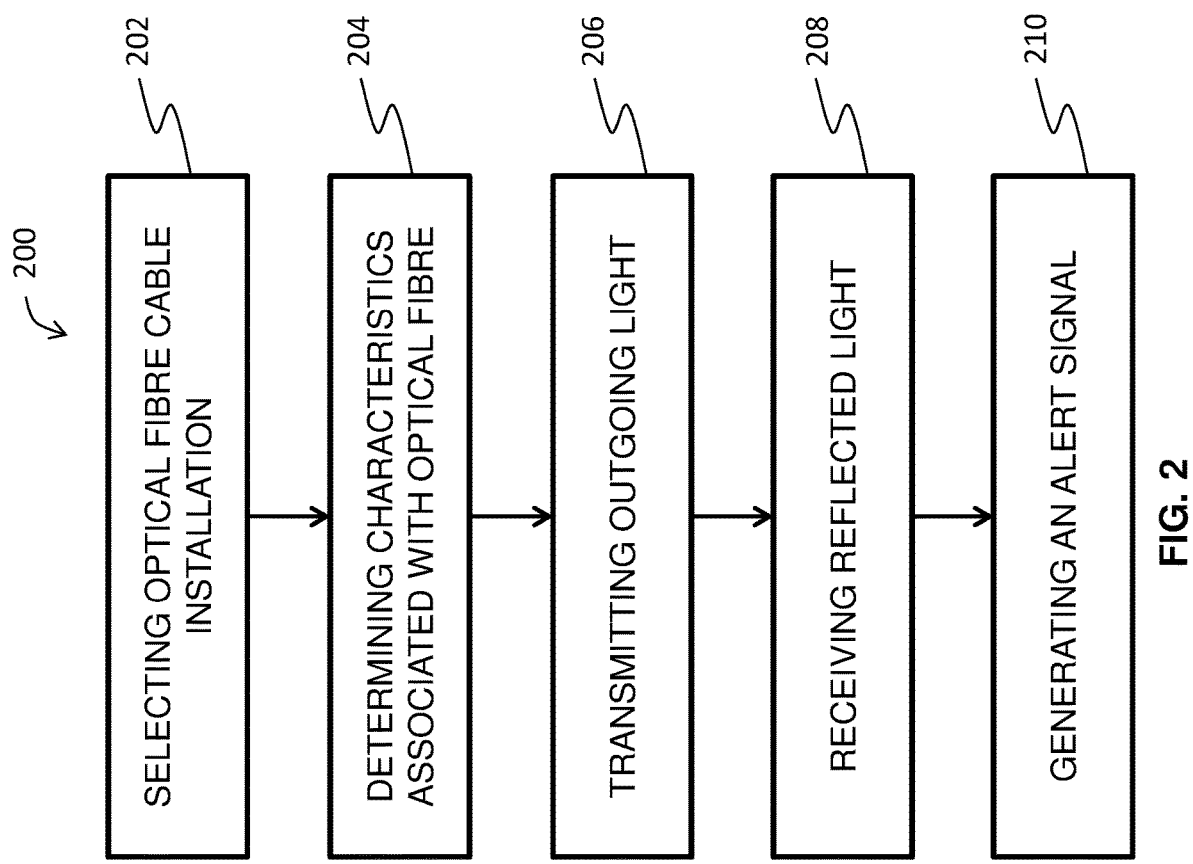
FIG. 2 illustrates an example of a disclosed method of distributed acoustic sensing.

Described herein is a method of distributed acoustic sensing. An arrangement of the disclosed method 200 is illustrated in FIG. 2. In general, the disclosed method includes the steps of (a) selecting an optical fibre cable installation having a path extending across a selected geographical area, the optical fibre cable installation including a bundle of optical fibres and forming part of a fibre-optic communications network (step 202), (b) determining characteristics associated with the optical fibre and/or the selected optical fibre the installation (step 204), (c) transmitting outgoing light in the optical fibre (step 206), (d) receiving reflected light back scattered along the optical fibre (step 208), and (e) based on the reflected light and the determined characteristics, generating an alert signal representative of an acoustic event (step 210). The disclosed method may be useful in the detection of acoustic events near or within the selected geographical area.

Rather than deploying a dedicated optical fibre for distributed acoustic sensing, the disclosed method relies on selecting an existing optical fibre cable installation forming part of the fibre-optic communication network. For example, the fibre-optic communication network may be a datacom network (e.g. to or from a data centre or between data centres) or a telecom network (e.g. to or from a local exchange) or an enterprise network (e.g. to or from large enterprises and cloud and data centre suppliers or between enterprises). While selecting an installation from an existing communication network for distributed acoustic sensing avoid the expenditure in installing a dedicated cable, a number of technical difficulties may need to be overcome. As a result, a skilled person would not be motivated in selecting an existing fibre-optic communication network for distributed acoustic sensing. Further, the skilled person would not recognise the technical difficulties in using an existing fibre-optic communication network for distributed acoustic sensing and would not recognise how to address these technical difficulties.

Selection of Optical Fibre Cable Installation

In one example, the disclosed method 200 involves, in step 202, selecting an existing optical fibre installation. The selected optical fibre cable installation has a path extending across a selected geographical area. The selected geographical area may be an urban or metropolitan area. In one arrangement, the optical fibre cable installation includes a bundle of optical fibres in which an optical fibre is unlit for communications purposes. The unlit optical fibre is therefore able to be used for distributed acoustic sensing. In another arrangement, the optical fibre cable installation includes a bundle of optical fibres in which one or more of the optical fibres include time or wavelength channels that are unused for communications. For example, in an enterprise network where dense wavelength-division multiplexing (DWDM) is employed, only some but not all of the DWDM channels carry communication traffic. The rest of the DWDM channels may be unused. One or more of the unused channels are therefore able to be used for distributed acoustic sensing. Further references to the use of unused channels or unlit optical fibres are applicable to either arrangement.

One or more factors may affect the selection of the optical fibre installation. For instance, an appropriate selection is based on an installation that forms part of an existing enterprise network. Unlike a dedicated optical fibre which has an end-to-end geometry, an enterprise network connects to multiple optical fibre cable installations, for example, via one or more data centres or hubs. A data centre represents the aggregation of servers and storage, with the advantage of having a high volume of fibres and fibre cables. In one arrangement, the multiple optical fibre cable installations may span different regions of the urban or metropolitan area. Selecting an enterprise network therefore facilitates a relatively large geographical coverage for distributed acoustic sensing through accessing multiple optical fibre cable termination or connection points at or near a central location (e.g. a data centre or hub).

Figure 3A:
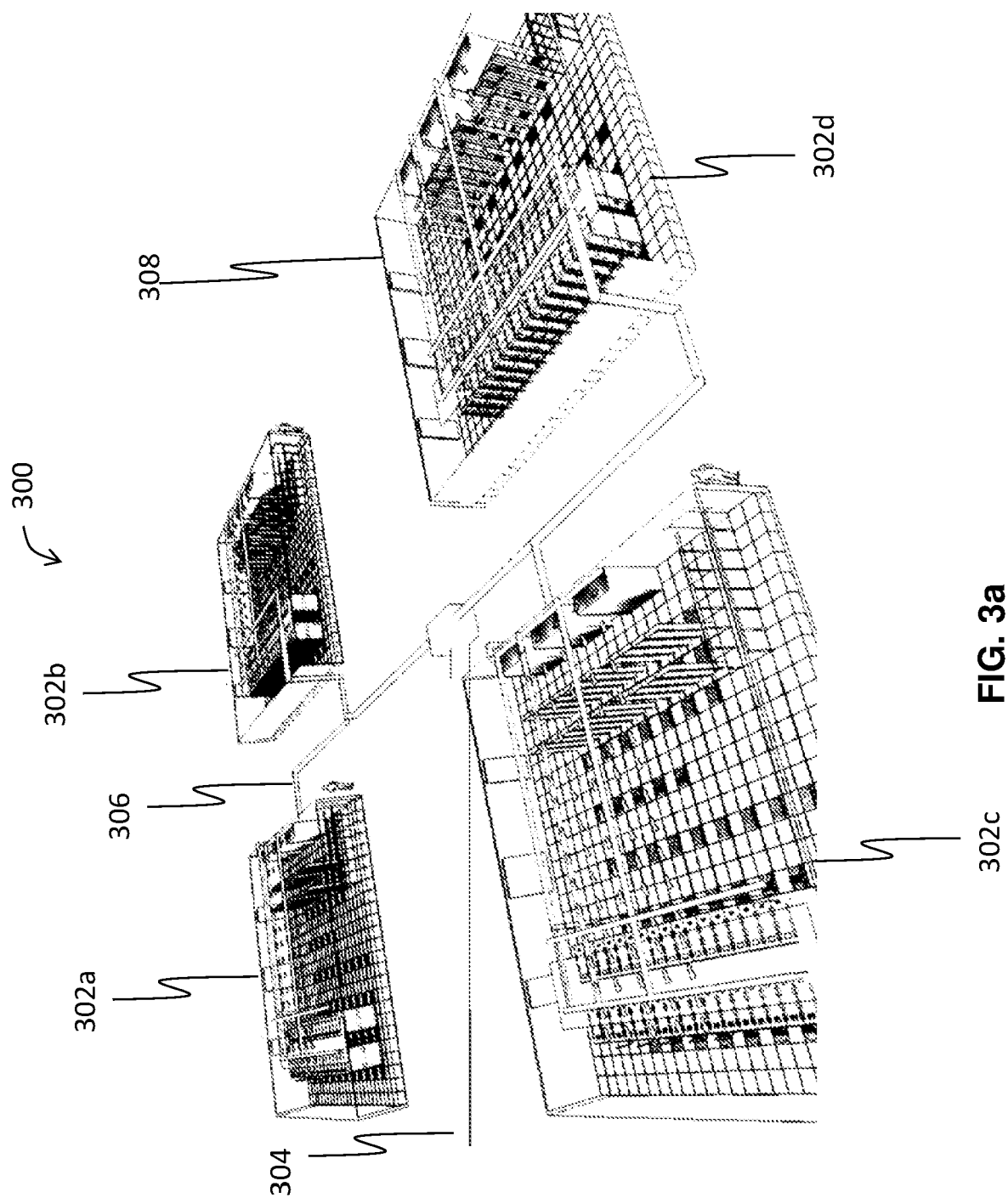
FIG. 3a is a schematic diagram of a data centre cluster including several data centre buildings.

In one arrangement, the selection of an optical fibre installation may be based on selecting an optical path passing through multiple data centres. For example, in a hub-and-spoke configuration, a central data centre is connected to multiple nearby data centres. As another example, in a data centre cluster, multiple nearby data centres are interconnected. FIG. 3a illustrates an example of a data centre cluster 300 including four data centre buildings 302a, 302b, 302c and 302d in communication with one another. The data centre buildings 302 within the cluster 300 share a transit communication fibre cable 304 that allows communication externally from the cluster 300 to remote service providers (such as carriers and content providers). Within the cluster 300, the data centre buildings 302 are communicatively interconnected by intra-data-centre communication fibre cables 306 in trenches that contain cross connects between server banks in different data centre buildings 302. Within each data centre building 302 are cross-connects 308. The intra-data-centre communication fibre cables 306 represents critical infrastructure to data centre operators as the service providers are not their responsibility and a break in the intra-data-centre communication fibre cables 306 will affect customer hosting, where there is no SDN overlay protections as with carrier mesh networks. Each of the transit communication fibre cable 304, intra-data-centre communication fibre cables 306 and cross-connects 308 represent a fibre-optic asset. The selection of an optical fibre installation may be based on selecting an optical path that passes through most if not all fibre-optic assets to be protected.

Figure 3B:
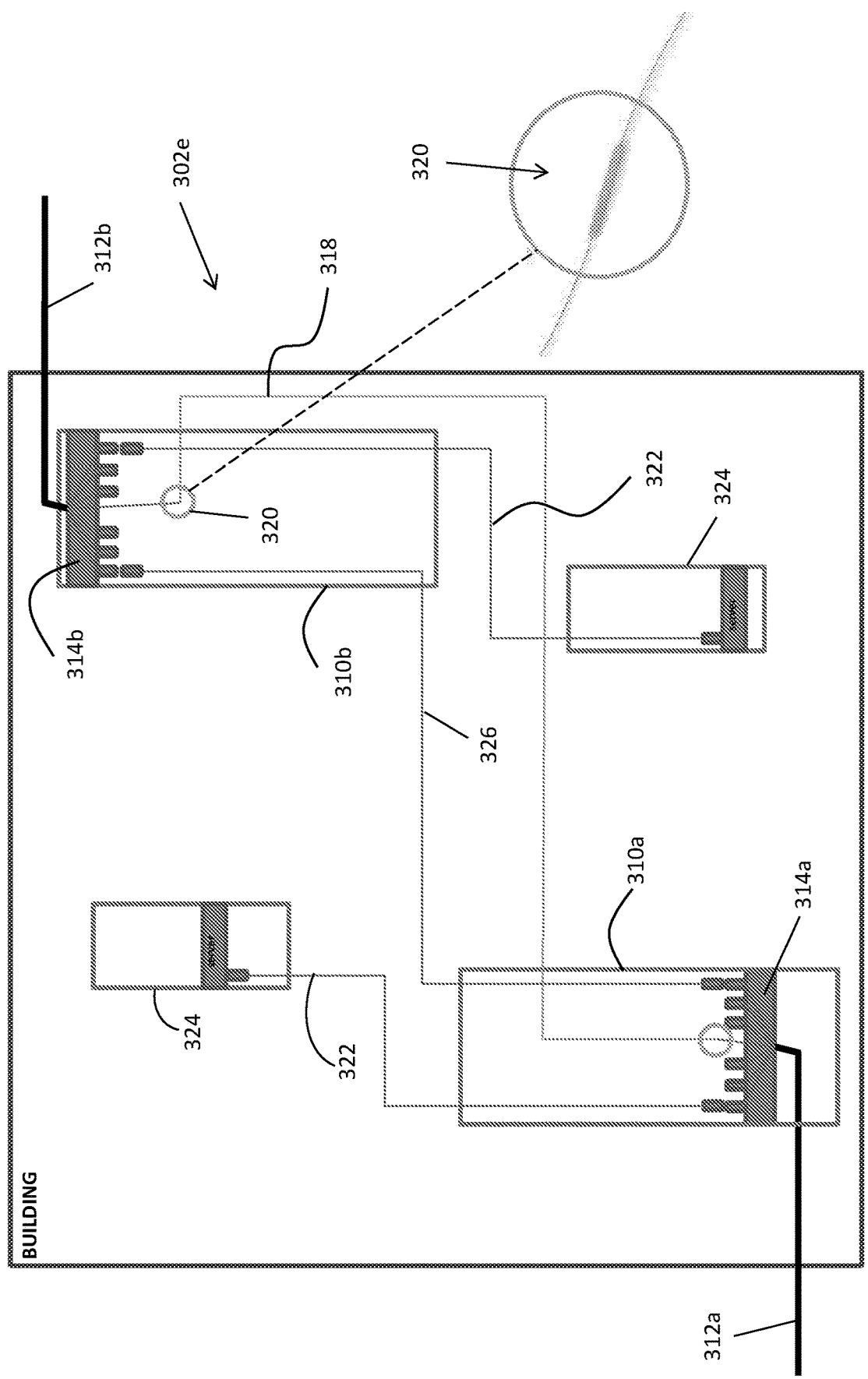
FIG. 3b is a schematic diagram of a single data centre building.

Within each data centre, such as that shown at 302e in FIG. 3b, fiber breakout cabinets 310a and 310b are shown for receiving respective outdoor fiber optic cables 312a and 312b in fiber transfer panels 314a and 314b. The disclosed method 200 may include a step of bypass-splicing. Bypass-splicing refers to a thermal splicing step in which the sensing fiber 318 is spliced at 320 so as to bypass connecting infrastructure such as the one or more fibre transfer panels (FTPs) 314a and 314b or patch panels. Some of the fiber optic cables 322 extend from the breakout cabinets 310a and 310b to building customer cabinets 324. Others are optical cross connect cables as is shown at 326.

Deploying a coherent OTDR requires a tighter tolerance to back reflections than a standard telecommunications transceiver (e.g. as found in an enterprise network). The use of flat connector type, such as FC-PC which are commonly found on FTPs, create unwanted levels of back reflections.

The step of bypass-splicing provides that, in a data centre environment, the sensing fibre 105 in the selected cable installation used for distributed acoustic sensing (or the sensing fibre 118) is not connected to the FTP(s) or patch panel(s). In one arrangement, bypass-splicing makes the sensing fibre 105 or 118 continuous from the patch lead at the DAS unit 110 to a termination unit. The disclosed method 200 may also include a step of determining whether the sensing fibre 105 or 118 passes through any connecting infrastructure. In accordance with the determination, the disclosed method 200 may include removing parts of the sensing fibre 105 or 118 corresponding to the connecting infrastructure, and splicing in a bypass fibre as replacement.

Further, the selection of an enterprise network over a long-haul network relates to an observation that a relatively short reach network requires no regeneration or amplification, and therefore tends to have a relatively large number of optical fibres in the bundle (i.e. a relatively large cross-section), in which there is an increased likelihood of one or more unused channels or unlit optical fibres. The unused channels or unlit optical fibre(s) may have been laid as part of a fibre-optic bundle to act as spare capacity allowing future growth in network demand. In some embodiments if all fibres are deployed then it is also feasible that a deployed but say less critical fibre may be repurposed. In contrast, a long-haul network may not be an appropriate selection since the long reach of the network requires regeneration or amplification. A long-haul network therefore tends to have a relatively small cross-section, in which there is a decreased likelihood of an unused channel or unlit fibre, or a fibre that is not performing a critical role.

An example of a large cross-section optical fibre cable is Prysmian's (a registered trade mark of Prysmian Cavi E Sistemi Engergia s.r.l.) Multi Loose Tube Duct Cable having 216 to 624 fibres. In other examples, a large cross-section may mean an optical fibre cable having 32 to 64 optical fibres. In some configurations, the reach of an urban or metropolitan area network is less than about 50 to 100 km in reach. The relatively short reach is limited by attenuation and optical receiver sensitivity where regeneration or amplification is not used. In other configurations, the present disclosure is not limited to an urban or metropolitan area network nor is it reach-limited to 50 to 100 km. The present disclosure is applicable to other communication networks having an unused channel or unlit optical fibre for communication purposes (e.g. international submarine optical fibre cables).

Alternatively or additionally, the selection of optical fibre cable installation may be based on proximity to existing infrastructure. Such existing infrastructure may include but is not limited to: roads, rail, water, power, electricity, telecommunications, data centres, buildings, bridges, tunnels, pedestrian access ways, rivers, harbours, lakes, docks, construction sites, industrial parks, and critical infrastructure. Still alternatively or additionally, the selection of optical fibre cable installation may be based on stakeholder types in accordance with the audience of the alert signal. The stakeholder types may include but are not limited to: emergency and disaster management, critical infrastructure management, citizen services, public administration services, law enforcement, and enterprise security & asset management.

Once an optical fibre cable installation is selected, the disclosed method 200 involves optically coupling (not shown) the DAS unit 100 to the selected installation. Depending on the termination types of the optical fibre 105, the optical coupling may involve splicing (if the termination type is a bare fibre) and/or connecting (if the termination type is an optical connector such as SC or FC connector). Where the acoustic event is determined, an alert signal representative of the acoustic event may be generated. The alert signal generating step may include classifying the alert signal into one or more classes of alerts (e.g. excavation threats, heavy pedestrian traffic, heavy roadway traffic, etc) based on acoustic signatures of the fluctuations. Some techniques in alert classification are summarised and further referenced in, for example, "Fiber Sensing: Optical fiber monitors the arterial networks of commerce", Laser Focus World, volume-51, issue-08, 8 Jun. 2015 (http://www.laser-focusworld.com/articles/print/volume-51/issue-08/features/fiber-sensing-optical-fiber-monitors-the-arterial-networks-of-commerce.html). In one configuration, the geographical area is divided into multiple zones corresponding to multiple sections of the optical fibre. In this configuration, each zone or corresponding section is associated with generation of one or more selected classes of alerts (or non-generation of one or more excluded classes of alerts). For example, each zone may be represented by a different stakeholder. Where the stakeholder is a utility connection operator (e.g. for supplying gas, power or water), the classes of alerts selected for generation may be associated with drilling, excavation or digging near a supply cable. Additionally, the classes of alerts excluded for generation may be associated with pedestrian traffic or roadway traffic. On the other hand, where the stakeholder is a transit operator (e.g. bus or rail operator), the classes of alerts selected for generation may be associated with pedestrian traffic or roadway traffic. Additionally, the classes of alerts excluded for generation may be associated with drilling, excavation or digging near a supply cable. The one or more selected or excluded classes of alert along the same optical fibre for different zones or sections are related to rail monitoring, road monitoring, and perimeter intrusion detection.

Acoustic Calibration

The disclosed method 200 also involves, in step 204, determining characteristics associated with the optical fibre and/or the selected optical fibre the installation. In one example, this determining step 204 includes acoustic calibration.

An urban or metropolitan area over which the distributed acoustic sensing is conducted is likely an area with unwanted acoustic interference. The unwanted acoustic interference may interfere, mask or otherwise affect the characteristics of the acoustic event being determined. In one configuration, to reduce the impact of unwanted acoustic interference, the disclosed method 200 includes applying spectral filtering to the detected fluctuations to reduce or remove fluctuations associated with the unwanted acoustic interference. For example, acoustic interference arising from bus engine noise may typically range from 1 to 120 Hz due to the engine's low revolution rates at low travelling speeds. The low revolution rates result in low acoustic frequencies which are more penetrating compared to higher acoustic frequencies. To reduce the impact of such penetrating noise, the detected fluctuations may be spectrally filtered to remove or attenuate low frequency fluctuations by, for instance, a low-pass filter having a cut-off frequency around 100-150 Hz.

Further, the disclosed method may selectively apply the spectral filtering to one or more zones of the geographical area. Different zones of the geographical area may require different or no spectral filtering. For example, away from an urban zone and on a highway, there may be no need to apply the low-pass filter but the disclosed method may apply a band-reject filter to remove or attenuate tyre noise. Alternatively or additionally, the disclosed method may selectively apply the spectral filtering to fluctuation based on time, e.g. the time of the day or the day of the week.

To determine the appropriate band-pass or band-reject frequencies for a particular zone or particular time, the step 204 may include obtaining baseline data of frequency content along the optical fibre. The baseline data may be separately obtained for individual zones and/or particular times. The baseline data may be obtained by monitoring fluctuations during a specific duration. The frequency content in the baseline data may be based on averaging several sets of data measured over the specific duration. The specific spectral filter to be used based on the zone or time may be configured to have a band-pass or band-reject profile which is opposite (e.g. inverted) the frequency content in the baseline data.

In one arrangement, the disclosed method 200 includes adjusting the band-pass or band-reject frequency range. The disclosed method 200 may further include determining the resulting noise level based on the adjusted frequency range. The adjustment may be dynamically implemented until the noise level is below a particular threshold. Alternatively or additionally, the adjustment may be recursively implemented until the noise level is below the particular threshold or another threshold. The noise level may be determined based on the noise bandwidth at each calibration site. The noise bandwidth may be determined by the channel analysis and acoustic waterfall functionality in the DAS software, and selecting appropriate waterfall and excitation frequencies for each calibration site. In one arrangement, the noise bandwidth is determined by implementing a filter having an integration time which is significantly longer than the transient signals of interest. For example, the noise background may be calculated based on time-integration over tens of minutes to relate to the threshold for the background noise over a range of positions along the fibre length (e.g. corresponding to a telecom pit below ground level). The differences between the acoustic intensity of the background noise compared with the intensity of the electrical signal 112 (e.g. relating to the telecom pit) provides an indication of the noise bandwidth.

Spatial Calibration

An optical fibre cable installation does not extend in a straight line. Further, unlike the use of a dedicated fibre where the correlation between a position along the fibre length and a corresponding location within the geographical area can be known during installation, selecting an existing optical fibre cable presents some uncertainty to this correlation. For example, optical fibres in telecom network in an exchange may be wound in spools to provide extra length for flexibility for repair or splicing purposes. Further, optical fibre lengths can change upon repair or splicing. It is therefore necessary to calibrate this correlation to accurately map any detected fluctuations in the positions along the fibre to the corresponding locations of any acoustic events.

In one configuration, the step 204 includes spatially calibrating between a position along the optical fibre and a location in the geographical area. The spatial calibration may include generating an acoustic calibration signal (e.g. a single-frequency tone at 420 Hz+/−5 Hz selected to be distinct to typical noise sources in urban centres) at specific locations of the geographical area to cause fluctuations for detection along the length of the optical fibre. By restricting the acoustic calibration signal frequency to 420 Hz+/−5 Hz, other acoustic noise sources in the urban centre can be removed. With the removal of other acoustic noise sources, one strong signal that corresponds to the single-frequency tone can be detected, as can be observed in FIG. 1*b* at around Channel 1990. As an illustrative example, an operator may travel to specific locations, e.g. to cable pits along the selected optical fibre cable installation where cable is typically coiled in a lidded pit for allowing additional cable runs to be made from that point if and when necessary. Up to 50 m or more of cable may be coiled in each pit, which are spaced at intervals of x-y m along the cable trench. The result is that there is a significant (up to 15% or more) discrepancy between the cable path length and the geographic path length.

In the geospatial calibration process the calibration acoustic signal is generated at each successive pit location and GPS coordinates of latitude and longitude in decimal degrees are taken at successive cable pits. Alternatively other locations along the cable path may be used, where the calibration acoustic signal is easily detectable, provided the GPS coordinates are recorded or noted. An optical fluctuation corresponding to the calibration acoustic signal is expected to be detected at a specific position along the optical fibre. The corresponding pair of coordinates corresponding to a location within a geographical region and the position along the optical fibre where the fluctuation is detected forms a geospatial calibration reference point, which then forms part of a look-up table of the type indicated below, which includes further spatial calibration points along the fibre and within the geographical area.

TABLE 1

GEOSPATIAL CALIBRATION LOOK-UP TABLE

| Date Created & Time | Name | Latitude (deg_dec) | Longitude (deg_dec) | Energy peak Point (m) | Optical Distance Start (m) | Optical Distance End (m) | Width (m) | Type |
|---|---|---|---|---|---|---|---|---|
| 20170714 1147 | 9883P | −33.92095274 | 151.18087789 | 9,883.0 | 9,875.0 | 9,893.0 | 18.0 | Pit |
| 20170714 1150 | 9775C | −33.92122648 | 151.18191622 | 9,775.0 | | | 0.0 | Cable |
| 20170714 1204 | 9193C | −33.92222025 | 151.18731547 | 9,193.0 | | | 0.0 | Cable |
| 20170714 1212 | 5128P | −33.92240548 | 151.18880188 | 5,124.0 | 5,118.0 | 5,129.0 | 11.0 | Pit |
| 20170714 1216 | 374P | −33.92241321 | 151.18884028 | 374.0 | 372.0 | 376.0 | 4.0 | Pit |
| 20170714 1237 | 4235P | −33.91819560 | 151.18831050 | 4,235.0 | 4,223.0 | 4,247.0 | 24.0 | Pit |
| 20170714 1244 | 3764P | −33.91768567 | 151.18876948 | 3,764.0 | 3,757.0 | 3,773.0 | 16.0 | Pit |

TABLE 1-continued

GEOSPATIAL CALIBRATION LOOK-UP TABLE

| Date Created & Time | Name | Latitude (deg_dec) | Longitude (deg_dec) | Energy peak Point (m) | Optical Distance Start (m) | Optical Distance End (m) | Width (m) | Type |
|---|---|---|---|---|---|---|---|---|
| 20170714 1247 | 8374P | −33.91767414 | 151.18878031 | 8,374.0 | 8,372.0 | 8,378.0 | 6.0 | Pit |
| 20170714 1255 | 8474P | −33.91817861 | 151.18832572 | 8,474.0 | 8,472.0 | 8,478.0 | 6.0 | Pit |

In the table above each point is identified with a date and time stamp and an name or reference which is similarly associated with the GPS co-ordinates captured by the data logger on an appropriate GPS enabled device such as a smart phone. The date logger transmits this information to the data centre where it is mapped. The peak point of the fluctuation on the optical fibre is logged, together with the end and start optical distances in the case of a pit being logged where a fibre loop is likely to be present. The width reading represents the length of that loop. The type column indicates whether the reading is taken at a cable (in which case the energy peak point is relevant) or a pit (in which case the optical start and end distances and width are relevant.

If an acoustic event is detected at a position along the fibre between two calibration points, an interpolation (e.g. linear or nonlinear) may be used to estimate the location of the corresponding occurrence within the geographical area. If an acoustic event is detected at a position along the fibre beyond the first and the last calibration points, an extrapolation (e.g. linear or nonlinear) may be used to estimate the location of the corresponding occurrence within the geographical area. By using the above geospatial calibration method, substantial variations which are encountered in the case of fibre optic networks which are not dedicated to performing location sensing and detecting functions but are rather dedicated communications and enterprise networks of the type contemplated in the present disclosure can be reduced and accuracy of location detection can be improved across the entire network quite substantially. This calibration of the optical path length to geospatial position enables accurate queueing of personnel to threat or cable break events in a way that the applicant understands is not possible with existing methods of determining the location of cable events.

Physical Calibration

The step 204 may further include physical calibration of the optical fibre selected for acoustic distributed sensing. Unlike dedicated fibre deployment, the disclosed method 200 involves use of an optical fibre of generally uncharacterised properties. For example, its core properties, attenuation properties, and trench properties are generally unknown. The obtained properties may be used for calibration of the detected fluctuations.

In one configuration, the step 204 includes obtaining core properties of the optical fibre. The core properties may include core diameter and/or numerical aperture. The core properties may affect the launch power of the light source, which in turn affects the intensity of the reflected light. For instance, the minimum reflected intensity, which can be increased by the launch power, is limited by the noise floor of the photodetector. Based on the core properties, the launch power of the light source may be adjusted accordingly in step 206 to achieve a desired reach. Alternatively or additionally, the step 204 includes obtaining attenuation properties of the optical fibre. The attenuation properties may include propagation loss per unit length, existing faults and/or spliced points. The attenuation properties may affect the reach of the distributed acoustic sensing. For instance, a higher propagation loss lowers the reach. Further, existing faults and/or spliced points may cause a different fluctuation (amplified or reduced) in the reflected light compared to fluctuations in an otherwise fault-free or splice-free fibre.

Figure 4:
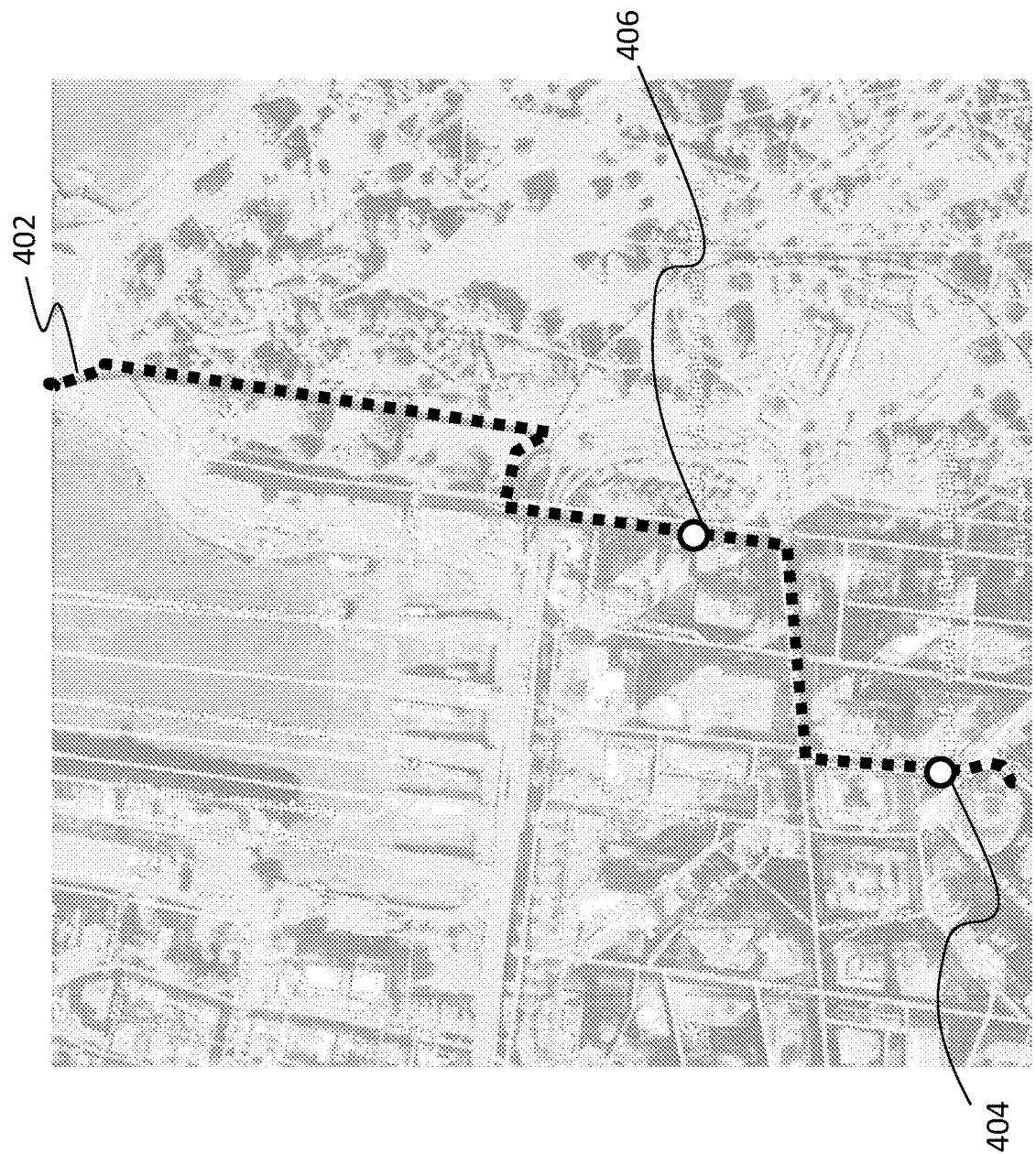
FIG. 4 illustrates an aerial map of different trench conditions.

Based on the attenuation properties, the launch power may be adjusted accordingly in step 206 to achieve a desired reach. Still alternatively or additionally, the step 204 includes obtaining trench properties of the optical fibre. Trench properties include properties affected by burial conditions and/or cable enclosure conditions. For instance, an optical fibre may be enclosed in 100 mm PVC conduit, and/or buried in a cement trench, earthenware and an underground tunnel. The trench properties may mask or otherwise affect the acoustic signature of an acoustic event. FIG. 4 illustrates an aerial map in the Circular Quay area in Sydney, Australia. The aerial map is overlaid with multiple sections of optical fibre (represented by at least labels "ch1346" and "ch1384"), each corresponding to a location (corner of Bent and Bligh Streets, and corner of Macquarie and Bridge Streets, respectively) near the Circular Quay area. Here, different sections of the optical fibres are subject to different trench conditions, which may be obtained from the cable supplier or from acoustic measurements by testing site. The trench properties, for example obtained via acoustic measurements, may be used for calibration of the detected fluctuations in step 210, such as in conjunction with some techniques in alert classification described in "Fiber Sensing: Optical fiber monitors the arterial networks of commerce" referenced above.

Stationary, Slowly Moving or Fast Moving Occurrences

As mentioned above, acoustic events-including objects—being determined may be indicative of specific stationary or moving occurrences. For example, as illustrated in FIG. 1b, features such as straight lines with relatively constant gradients are associated with the moving objects (with the gradients being indicative of speed) that cause the relevant acoustic events detected by the DAS unit 100. The disclosed method 200 may include the step of determining whether an acoustic event is stationary or moving. This determination may include whether a moving acoustic event relates to a slow moving noise source (e.g. drilling, excavating, bore tunnelling, etc.) or a fast moving noise source (e.g. cars, trains, etc). For example, the determination may include comparing an estimated speed (e.g. based on the gradient of a straight line) of the acoustic event with a threshold speed value. Where the estimated speed of the acoustic event is below the threshold speed value, the acoustic event is determined to be slowly moving or stationary, otherwise it is determined to be fast moving. The disclosed method 200 may further include the step of, based on the determination, suppressing the generation of the alert signal representative of the acoustic event. This suppression is useful in avoiding false alarms, particularly in an urban environment where the number of occurrences of benign urban activities (e.g. pedestrian walking, and moving busses and trains) can be much higher than that of genuine threats (e.g. technical persons or engineers working on optical fibres, drilling, digging and excavation).

For example, in the context of telecommunication infrastructure, detection of a stationary or slowly moving noise source indicates a higher likelihood of that noise source being a threat, whereas detection of a fast moving noise source indicates a lower likelihood of that noise source being a threat. The threat likelihood may be graded (e.g. in a scale of low, medium and high, or in a scale of 1 to 10). The threshold grade beyond which a threat alert is (or is not) generated may be adjustable, e.g. dynamically, based on the use-case context. Without such suppression, a high number of false alarms may be generated to a point which renders the disclosed method ineffective. In one arrangement, the threshold speed value and/or the threshold grade may be adjusted to reduce the number of false alarms.

Switching

To increase the total length of existing optical fibre cable that can be monitored from one DAS unit 100, in one configuration, the disclosed method further includes switching the transmission of the outgoing light and the reception of the reflected light to another unused channel or unlit optical fibre for communication, the other optical fibre being in another bundle of optical fibres in another selected optical fibre cable installation having another path extending across another selected geographical area.

FIG. 5 schematically illustrates an example of the DAS unit 100 optically coupled, e.g. via an optical fibre, to an optical switch 500 to form a system 400 of distribution acoustic sensing. The optical switch 500 may be located in a data centre or hub, which connects to multiple optical fibre installations (502a, 502b, 502c, 502d and 502e). The DAS unit 100 may be collocated with or separately located from the optical switch 500. In the case where the DAS unit 100 is collocated with the optical switch 500 in a data centre or hub, the DAS unit 100 is within close proximity to an ecosystem of optical communication networks (e.g. enterprise networks, cloud provider networks, IP transit provider networks, internet service provider networks, and telecom carrier networks, including regional, metropolitan and long-haul networks). Accordingly, the DAS unit 100 at the data centre or hub may be configured to selectively access one or more different communications networks types for distributed acoustic sensing. As mentioned, in one example, the selection of an enterprise network provides an advantage of a relatively large optical fibre cross section.

The optical switch 500 is configured to couple light between the DAS unit 100 and any one of multiple optical fibre installations (502a, 502b, 502c, 502d and 502e). The multiple optical fibre installations 502 together span a larger geographical area than would otherwise be spanned by any one of the fibre installations 502 alone. In one configuration, the optical switch 500 time-multiplexes the multiple optical fibre installations. For example, transmission of outgoing light and reception of reflected light is cycled through the multiple optical fibre installations and switched to a next installation at regular intervals.

In some circumstances, different installations may detect the same acoustic event to increase the spatial accuracy of locating the acoustic event. For example, an acoustic event may be detected by both installations 502b and 502c but not by installations 502a, 502d and 502e. Such detection indicates that the corresponding occurrence is located in a geographical region between 502b and 502c. If only installation 502b was interrogated, the detection might present an uncertainty as to where (e.g. either between installations 502a and 502b or between installations 502b and 502c) the occurrence is located. If the acoustic event generates seismic waves, the waves may propagate across to multiple cables. In this case, the epicentre may be triangulated based a measurement of direction of propagation and time of flight calculations. Now that arrangements of the present disclosure are described, it should be apparent to the skilled person in the art that the described arrangements have the following advantages:

The expense of deploying a dedicated optical fibre for distributed acoustic sensing is avoided.

The ability to measure an asset or acoustic event at a particular location where it would not otherwise be possible to locate a dedicated sensor system as the real-estate or land is owned by another party.

The calibration steps adapt an existing installation to imperfect or non-ideal characteristics that would otherwise be absent in dedicated optical fibre deployment.

Where switching is used, the system can readily be scaled to expand the geographical area of interest or the total length of cable to be monitored. Further, switching can increase the spatial accuracy of locating an occurrence outside the cable.

It will be understood that the invention disclosed and defined in this specification extends to all alternative combinations of two or more of the individual features mentioned or evident from the text or drawings. For example, any one or more the calibration steps can be used separately or in conjunction. All of these different combinations constitute various alternatives of the present disclosure.

The invention claimed is:

1. A method of distributed acoustic sensing, the method including:
   selecting an optical fibre cable installation having a path extending across a selected geographical area, the optical fibre cable installation including a bundle of optical fibres that form part of an established and dedicated fibre-optic communications network, the bundle of optical fibres including (1) a first subset comprising at least one optical fibre or channel to carry communication traffic, and (2) a second subset comprising at least one optical fibre or channel that is unused or unlit for communication;
   repurposing the second subset of at least one optical fibre or channel in the bundle of optical fibres for distributed acoustic sensing;
   determining characteristics associated with at least part of the bundle of optical fibres in the selected optical fibre cable installation, including geospatially mapping between one or more positions along a length of the bundle of optical fibres and a corresponding one or more locations in the selected geographical area;
   transmitting outgoing light through the second subset of at least one optical fibre or channel;
   receiving reflected light back scattered along the second subset of optical fibre or channel, the reflected light including fluctuations over time; and
   based on the fluctuations and the determined characteristics, generating an alert signal representative of an acoustic event.

2. The method of claim 1, wherein the fibre-optic communications network is an established urban or metropolitan area network.

3. The method of claim 1, wherein the fibre-optic communications network is an enterprise network.

4. The method of claim 3, wherein the enterprise network includes a plurality of data centres interconnected by optical fibre installations.

5. The method of claim 1, wherein the geospatially mapping operation further comprises:
generating an acoustic calibration signal at or adjacent the one or more positions along the second subset of at least one optical fibre or channel,
determining and logging the geospatial locations of the positions in terms of geographic coordinates on the earth's surface,
detecting corresponding fluctuations at the one or more locations in the geographical area in received reflected light backscattered along the second subset of at least one optical fibre or channel, and
determining a path length of the second subset of at least one optical fibre or channel corresponding to the one or more geospatial locations.

6. The method of claim 5, where the geospatially mapping operation further comprises correlating the path length of the second subset of at least one optical fibre or channel with the geographic co-ordinates of the one or more locations to generate a look up table correlating the path length with geographic co-ordinates.

7. The method of claim 1, wherein generating the alert signal includes determining a location of an occurrence of an incident in the selected geographical area based on a corresponding fluctuation detected based on the mapping.

8. The method of claim 1, wherein the determining the characteristics includes acoustically calibrating the second subset of at least one optical fibre or channel to reduce impact of unwanted acoustic interference.

9. The method of claim 8, wherein the acoustically calibrating includes applying a spectral filter to the fluctuations to band-pass or band-reject the unwanted acoustic interference.

10. The method of claim 9, wherein the selected geographical area includes multiple zones corresponding to multiple sections of the second subset of at least one optical fibre or channel, and wherein the spectral filter applying step includes applying the spectral filter with band-pass or band-reject characteristics based on one of the multiple zones or corresponding sections.

11. The method of claim 9, wherein the spectral filter applying step includes applying the spectral filter with band-pass or band-reject characteristics based on at least one of the time of a day and the day of a week.

12. The method of claim 1, wherein determining the characteristics includes physically calibrating the second subset of at least one optical fibre or channel.

13. The method of claim 1, wherein the physically calibrating includes obtaining any one or more of the following properties of the second subset of at least one optical fibre or channel: core properties, attenuation properties, and trench properties.

14. The method of claim 13, wherein the core properties include at least one of a core diameter and a numerical aperture.

15. The method of claim 13, wherein the attenuation properties include at least one of a propagation loss, existing faults and spliced points.

16. The method of claim 13, wherein the trench properties include at least one of burial conditions and cable enclosure conditions.

17. The method of claim 1, wherein generating the alert signal includes classifying the alert signal into one or more classes of alerts based on acoustic signatures of the fluctuations.

18. The method of claim 17, wherein the selected geographical area includes multiple zones corresponding to multiple sections of the second subset of at least one optical fibre or channel, each zone or corresponding section being associated with generation of one or more selected classes of alerts.

19. The method of claim 17, wherein the selected geographical area includes multiple zones corresponding to multiple sections of the second subset of at least one optical fibre or channel, each zone or corresponding section being associated with non-generation of one or more excluded classes of alerts.

20. The method of claim 18, wherein the one or more selected or excluded classes of alerts corresponding to each zone or section of the second subset of at least one optical fibre or channel are related to at least one of rail monitoring, road monitoring, and perimeter intrusion detection.

21. The method of claim 1, further comprising:
coupling a distributed acoustic sensing (DAS) unit to a plurality of fibre cable installations via an optical switch, wherein the optical fibre cable installation is selected from the plurality of fibre cable installations by the optical switch, and the alert signal is generated by the DAS unit based on the fluctuations and the determined characteristics.

22. The method of claim 1, wherein the second subset of at least one optical fibre or channel is repurposed to apply acoustic sensing to detect an acoustic event of excavation, drilling, digging, bore tunneling, traffic flow, train passing by or pedestrian flow near or within the selected geographical area.

* * * * *